United States Patent [19]

Nishizawa

[11] Patent Number: 5,047,445
[45] Date of Patent: Sep. 10, 1991

[54] ELECTROCONDUCTIVE POLYMERIC MATERIAL

[75] Inventor: Akira Nishizawa, Yokohama, Japan

[73] Assignee: Victor Company of Japan, Ltd., Yokohama, Japan

[21] Appl. No.: 368,715

[22] Filed: Jun. 20, 1989

[30] Foreign Application Priority Data

Jun. 20, 1988 [JP] Japan .................................. 63-151922

[51] Int. Cl.⁵ ............................................... C08J 3/28
[52] U.S. Cl. ....................................... 522/114; 522/66; 522/187; 525/274; 525/331.5; 252/519
[58] Field of Search ................... 522/114, 66, 187; 525/274, 331.5; 252/519

[56] References Cited

U.S. PATENT DOCUMENTS 4,049,618  9/1977  Kracklauer ........................ 524/396
4,575,544  3/1986  Rooney et al. .................... 526/118
4,780,246  10/1988 Naarmann ......................... 252/500

FOREIGN PATENT DOCUMENTS 1161685  2/1984  Canada .................................. 96/266

Primary Examiner—Marion E. McCamish
Assistant Examiner—Mark A. Chapman
Attorney, Agent, or Firm—Fleit, Jacobson, Cohn, Price, Holman & Stern

[57] ABSTRACT

An electroconductive polymeric material comprises a dispersion of dicyclopentadienyl iron in a vinyl chloride resin having ($-CH_2-CHCl-$) structure in the molecular chain or a vinylidene chloride resin having ($-CH_2-CCl_2-$) structure in the molecular chain irradiated with light having ultraviolet rays. This electroconductive polymeric material can easily be molded because it gels under heating, and can also be formed into a film by dissolving it in an organic solvent and evaporating the solvent after casting or spreading. Doping the electroconductive polymeric material with an anionic dopant after the irradiation provides optical response characteristics with further improved electroconductivity.

18 Claims, 2 Drawing Sheets

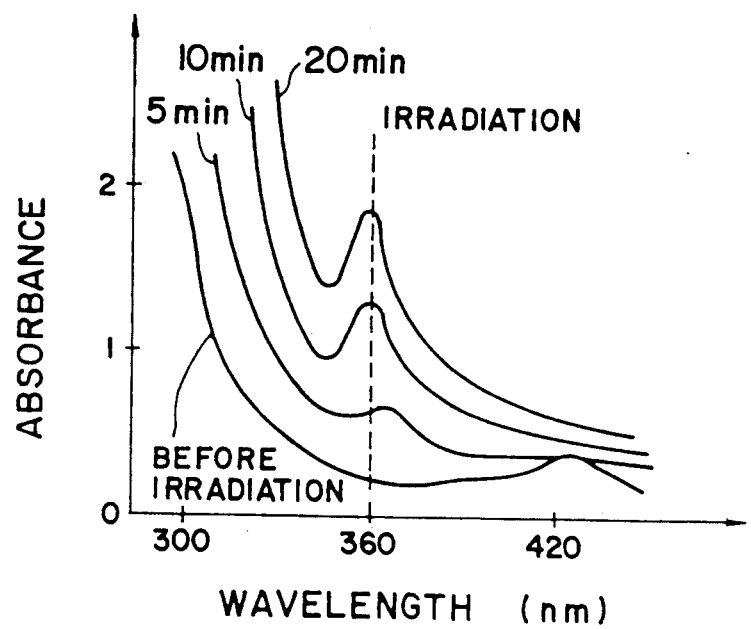
F I G. 1
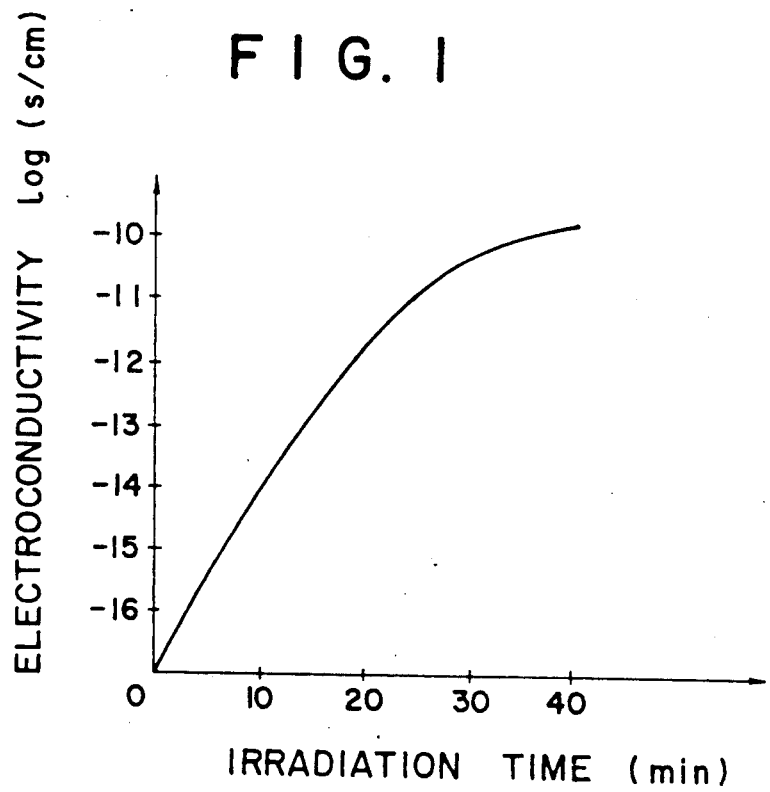
F I G. 2

ELECTROCONDUCTIVE POLYMERIC MATERIAL

BACKGROUND OF THE INVENTION

1. Field of the Invention

The present invention relates to a novel electroconductive polymeric material. More particularly, the present invention relates to an electroconductive polymeric material which is used for optical sensors such as capacity-type video disks, FET elements and CCD, antistatic mats, photocells and the like.

2. Description of the Prior Art

As the technique heretofore adopted for rendering a polymeric material electroconductive, there can be mentioned a technique of incorporating an electroconductive filler such as carbon black or silver powder into a polymeric material to form a composite material, and a technique of imparting an electroconductivity to a polymeric material per se, for example, polyacetylene, polypyrrole or polyaniline.

When an electroconductivity is imparted to a polymeric material per se, the material may have a property of photovoltaic effect or an electrochromic effect which makes the material more versatile, and some of such electroconductive polymeric materials have been developed.

However, these electroconductive polymeric materials are different from ordinary polymeric materials in that they do not gel even under heating. Accordingly, molding of the electroconductive polymeric materials is difficult, and they cannot be formed into films because they are not soluble in organic solvents.

Moreover, these electroconductive polymeric materials are prepared according to a thermal decomposition process or an electrolytic polymerization process, which is different from the polymerization process customarily adopted for the production of ordinary polymers. Therefore, the mass production is very difficult.

SUMMARY OF THE INVENTION

The present invention has been completed as the result of research made with a view to solving the foregoing problems involved in the conventional techniques of producing electroconductive polymeric materials.

In accordance with the present invention, there is provided an electroconductive polymeric material, which is formed by dispersing dicyclopentadienyl iron in a vinyl chloride resin having (—CH$_2$—CHCl—) structure in the molecular chain or a vinylidene chloride resin having (—CH$_2$—CCl$_2$—) structure in the molecular chain and irradiating the resin with light having ultraviolet rays.

BRIEF DESCRIPTION OF THE DRAWINGS

FIG. 1 is a graph illustrating the relation between the wavelength of ultraviolet rays and the absorbance, observed when a vinyl chloride resin film is irradiated with ultraviolet rays.

FIG. 2 is a graph illustrating the relation between the ultraviolet ray irradiation time and the electroconductivity of the irradiated film.

DETAILED DESCRIPTION OF THE PREFERRED EMBODIMENTS

Figure 3:
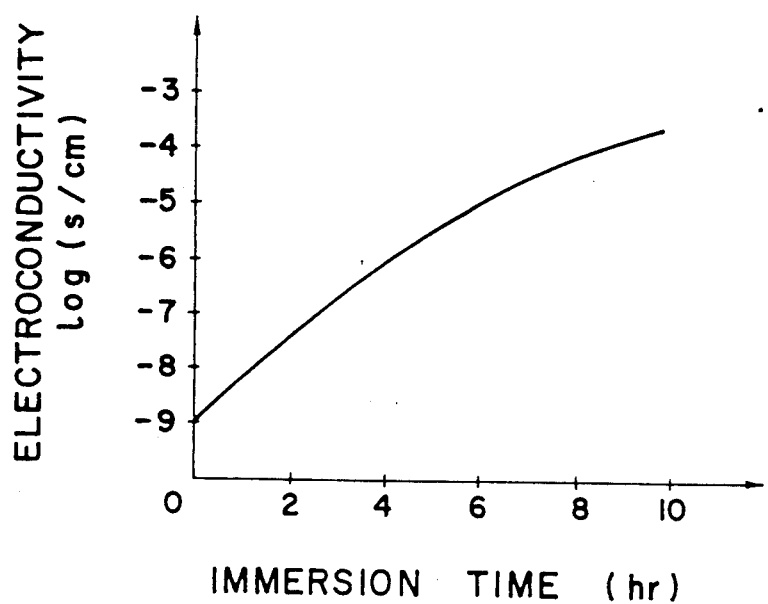
FIG. 3 is a graph illustrating the relation between the immersion time and the electroconductivity, observed when a film is doped.

The type of vinyl chloride resin or vinylidene chloride resin used in the present invention is not particularly critical, so far as (—CH$_2$—CHCl—) or (—CH$_2$—CCl$_2$—) structures are contained in the resin molecule. For example, there can be mentioned a vinyl chloride homopolymer, a vinyl chloride/vinyl acetate copolymer, a vinyl chloride/ethylene copolymer, a vinyl chloride/ethylene/vinyl acetate graft copolymer, a vinylidene chloride homopolymer and a vinyl chloride/vinylidene chloride copolymer. In the vinyl chloride/vinylidene chloride, either vinyl chloride or vinylidene chloride can be the main component, but in other copolymers or graft copolymers, vinyl chloride is generally the main component and the vinyl chloride content is generally at least 80%. Among the foregoing polymers, a vinyl chloride homopolymer is especially preferably used.

In general, the vinyl chloride resin or vinylidene chloride resin is dissolved in an organic solvent. As the organic solvent, there can be used, for example, methylethylketone (MEK), tetrahydrofuran (THF), dimethyl formamide (DMF) and chloroform. For example, in case of a vinyl chloride homopolymer, when tetrahydrofuran is used as the solvent, a transparent film is difficult to obtain, but when methylethylketone is used as the solvent, a transparent film can easily be obtained. In case of a vinyl chloride homopolymer, the amount of the solvent is such that the homopolymer is dissolved in methylethylketone at a concentration of 3 to 5%, and the homopolymer can be dissolved with use of a small amount of tetrahydrofuran.

Powder dicyclopentadienyl iron (ferrocene) is then dispersed in the resulting vinyl chloride or vinylidene chloride resin solution with stirring. If the powder is added in a larger amount, the obtained film becomes red, or the pliability is lost and the film becomes brittle. Therefore, the powder is used in an amount of 1 to 30% by weight, preferably 3 to 10% by weight, based on the resin. As the amount of ferrocene is increased, the amount of the cation formed by irradiation conducted for a certain time becomes large and the electroconductivity is improved.

After the powder of ferrocene has been sufficiently dispersed, the resin solution is dropped and spread on a glass sheet, and the solvent is evaporated to form a film. The formed film is irradiated with ultraviolet rays having a wavelength of up to 360 nm. Visible rays or infrared rays may be contained in the ultraviolet rays. In general, the irradiation with ultraviolet rays is carried out for 1 to 2 hours with a lamp power of 120 mW/cm$^2$.

When the resin is irradiated with ultraviolet rays, the color of the resin is changed to a yellowish green color, and an absorption peak comes to appear in the vicinity of 360 nm in the ultraviolet absorption spectrum of the resin and the ferrocenium cation, not present before the irradiation with ultraviolet rays, is formed. As is apparent from the examples given hereinafter, if the irradiation with ultraviolet rays is conducted for about 10 minutes, formation of this cation is confirmed, and if the irradiation is conducted for a longer time, a large quantity of the cation is formed and the electroconductivity is improved. Shortly after the appearance of the absorption peak at 360 nm, the electroconductivity of the resin is increased to about $10^{-9}$ s/cm from about $10^{-16}$ s/cm of the starting resin.

The formed resin having an improved electroconductivity has an excellent transparency and is pliable.

If the resin is doped with an anionic dopant such as $ClO_4^-$, $AsF_4^-$, $PF_4^-$, $BF_4^-$ or $HSO_4^-$, the electroconductivity can be increased to about $10^{-4}$ s/cm. This doping can be accomplished by immersing the resin for a certain time in an aqueous solution containing an anion as mentioned above at an appropriate concentration. For example, the resin can be immersed in an aqueous solution containing perchloric acid ($HClO_4$) at a concentration of 30% for up to 10 hours.

The reaction course of chemical changes at the irradiation with ultraviolet rays and the doping with the anionic dopant, described hereinbefore, can be expressed as follows ($\sigma$ stands for the electroconductivity):

a wavelength of 360 nm was formed in the film. Finally, an electroconductivity of $10^{-9}$ s/cm was obtained.

FIG. 1 shows the relation between the wavelength and the absorbance, observed according to the ultraviolet ray irradiation time, and FIG. 2 shows the relation between the ultraviolet ray irradiation time and the electroconductivity.

As is seen from FIG. 1, formation of the cation was not confirmed if the irradiation time was shorter than 10 minutes, but as the irradiation time was further prolonged, the absorbance at a wavelength of 360 nm increased, and the ferrocenium cation was formed in a large quantity.

Furthermore, as is seen from FIG. 2, an electroconductivity of $10^{-9}$ s/cm could be obtained by carrying out the irradiation for 40 minutes to about 1 hour, and as the irradiation time was prolonged, the electroconductivity increased.

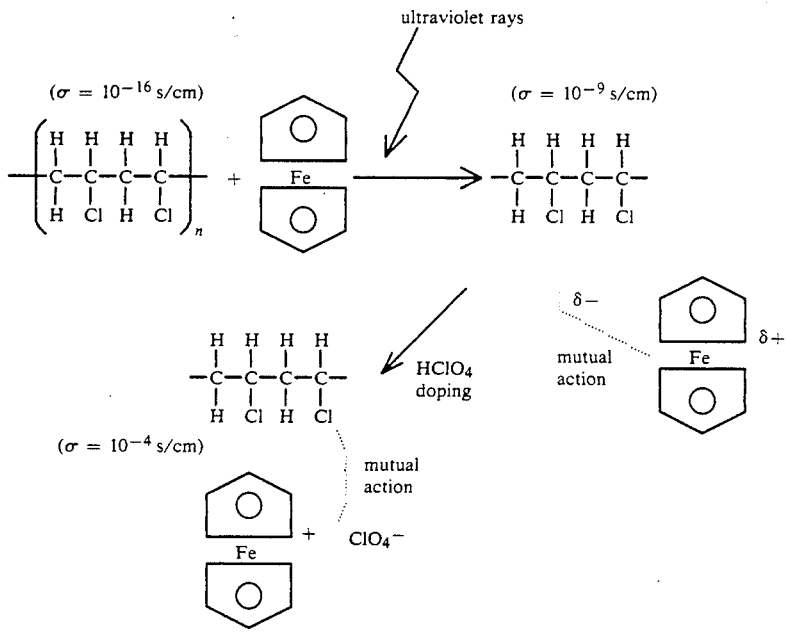

The present invention will now be described in detail with reference to the following examples that by no means limit the scope of the invention.

EXAMPLE 1

At first, 2.5 g of a vinyl chloride resin having a polymerization degree of about 600 was dissolved in 50 ml of methylethylketone.

Then, 0.2 g of dicyclopentadienyl iron (ferrocene) was added to the solution, and the solution was sufficiently stirred.

Then, the solution was spread on a slide glass and methylethylketone as the solvent was evaporated to obtain a yellow, transparent and pliable film having a thickness of about 20 μm.

Electrodes were formed on both the ends of the film by using a silver paint and the electroconductivity was measured. It was found that the electroconductivity was $10^{-16}$ s/cm.

The film was irradiated with light of a xenon lamp through a filter allowing permeation of only ultraviolet rays having a wavelength of 330 to 360 nm, whereby the ferrocenium cation producing an absorption peak at When the film irradiated with ultraviolet rays was immersed in a 30% aqueous solution of perchloric acid to effect doping, the electroconductivity further increased and a film having an electroconductivity of $10^{-4}$ s/cm was obtained.

The relation between the immersion time and the electroconductivity is shown in FIG. 3.

As is seen from FIG. 3, the longer was the immersion time, the higher was the electroconductivity.

The doped film was brown, transparent and pliable, and the doped film had such optical response characteristics that the electroconductivity was changed under irradiation with light.

Figure 4:
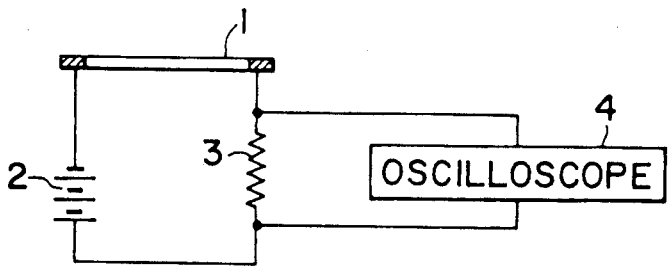
FIG. 4 is a diagram of a circuit for testing the optical response characteristics of the doped film.
Figure 5:
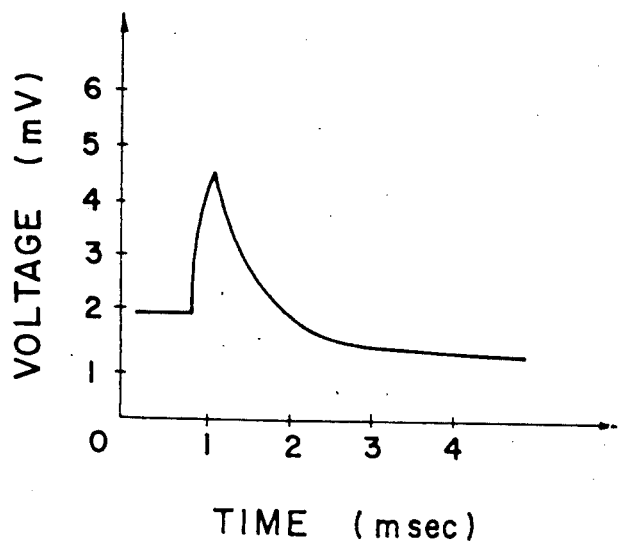
FIG. 5 is a graph illustrating the optical response characteristics.

A circuit was formed by connecting this doped film 1 to a direct current power source 2 of 10 V through a resistor 3 of 400 kΩ, as shown in FIG. 4. When the film 1 was irradiated with light and the change of the voltage was measured by an oscilloscope 4, a graph as shown in FIG. 5 was obtained and it was confirmed that the film 1 had optical response characteristics.

EXAMPLE 2

At first, 150 mg of polyvinyl chloride (PVC) was dissolved in 5 ml of tetrahydrofuran (THF), and 15 mg of ferrocene was added to the solution and the solution was sufficiently stirred. The solution was dropped on a slide glass and THF was evaporated to form a standing film.

The film was promptly colored by irradiation under a xenon lamp and an absorption was observed in the vicinity of 360 nm. If this film was dissolved in THF again, and the solution was reformed into a film, this absorption was not observed in the film. However, if the film was irradiated under a xenon lamp, the absorption was caused to appear at 360 nm again. Accordingly, it was confirmed that this absorption was not caused by the chemical reaction between PVC and ferrocene but by the mutual action of them.

The volume resistivity of the irradiated film was $5 \times 10^9$ $\Omega$-cm. When the irradiated film was immersed in a 30% aqueous solution of $HClO_4$ for 24 hours, washed with water and dried, the volume resistivity of the formed film was $2 \times 10^4$ $\Omega$-cm.

Separately,

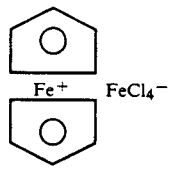

was synthesized from ferrocene and ferric chloride and was dissolved in a solution of PVC in THF, and the solution was formed into a film. An absorption was observed at 360 nm.

Furthermore,

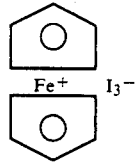

was synthesized from ferrocene and iodine and a film was similarly prepared. An absorption was similarly observed at 360 nm.

From the foregoing results, it was confirmed that the absorption at 360 nm was due to the ferrocenium cation

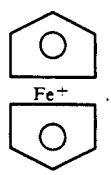

As is apparent from the foregoing description, since the electroconductive polymeric material of the present invention is prepared by using a vinyl chloride resin or vinylidene chloride resin obtained by the customary polymerization process, the electroconductive polymeric material of the present invention gels under heating and can easily be molded, and moreover, the electroconductive polymeric material of the present invention can be formed into a film by dissolving it in an organic solvent.

Moreover, the present invention is advantageous in that an electroconductive polymeric material having such properties can easily be produced in large quantities.

I claim:

1. An electroconductive polymeric material comprising: a dispersion of dicyclopentadienyl iron with no chemical reaction in a resin selected from the group consisting of vinyl chloride resin having ($—CH_2—CHCl—$) structure in the molecular chain and vinylidene chloride resin having ($—CH_2—CCl_2—$) structure in the molecular chain, said resin being dissolved in an organic solvent which has evaporated, and said resin being irradiated with light having ultraviolet rays, so that when redissolved in said solvent the polymeric material becomes non-electroconductive.

2. The electroconductive polymeric material as claimed in claim 1, wherein said resin comprises a member selected from the group consisting of a vinyl chloride homopolymer, a vinyl chloride/vinyl acetate copolymer, a vinyl chloride/ethylene copolymer, a vinyl chloride/ethylene/vinyl acetate graft copolymer, a vinylidene chloride homopolymer and a vinyl chloride/vinylidene chloride copolymer.

3. The electroconductive polymeric material as claimed in claim 2, wherein said organic solvent comprises a material selected from the group consisting of methylethylketone, tetrahydrofuran, dimethyl formamide and chloroform.

4. The electroconductive polymeric material as claimed in claim 3, wherein said irradiated resin is doped with an anionic dopant.

5. The electroconductive polymeric material as claimed in claim 4, wherein said dopant is a material selected from the group consisting of $ClO_4—$, $AsF_4—$, $PF_4—$, $BF_4—$ and $HSO_4$.

6. The electroconductive polymeric material as claimed in claim 1, wherein said organic solvent comprises a material selected from the group consisting of methylethylketone, tetrahydrofuran, dimethyl formamide and chloroform.

7. The electroconductive polymeric material as claimed in claim 1, wherein said irradiated resin is doped with an anionic dopant.

8. The electroconductive polymeric material as claimed in claim 7, wherein said dopant is a material selected from the group consisting of $ClO_4^-$, $AsF_4^-$, $PF_4^-$, $BF_4^-$ and $HSO_4^-$.

9. The electroconductive polymeric material as claimed in claim 1, made by the process comprising:
dispersing dicyclopentadienyl iron with no chemical reaction in a resin selected from the group consisting of vinyl chloride resin ($—CH_2—CHCl—$) structure in the molecular chain and a vinylidene chloride resin having ($—CH_2—CCl_2—$) structure in the molecular chain;
dissolving said resin in an organic solvent;
evaporating said solvent;
irradiating said resin with light having ultraviolet rays; and
redissolving the polymeric material in said solvent so that said polymeric material becomes non-electroconductive.

10. The electroconductive polymeric material as claimed in claim 9, wherein said resin comprises a material selected from the group consisting of a vinyl chloride homopolymer, a vinyl chloride/vinyl acetate copolymer, a vinyl chloride/ethylene copolymer, a vinyl chloride/ethylene/vinyl acetate graft copolymer, a vinylidene chloride homopolymer and a vinyl chloride/vinylidene chloride copolymer.

11. The electroconductive polymeric material as claimed in claim 9, wherein said organic solvent comprises a material selected from the group consisting of methylethylketone, tetrahydrofuran, dimethyl formamide and chloroform.

12. The electroconductive polymeric material as claimed in claim 9, and further comprising doping said irradiated resin with an anionic dopant.

13. The electroconductive polymeric material as claimed in claim 12, wherein said dopant is a material selected from the group consisting of $ClO_4-$, $AsF_4-$, $PF_4-$, $BF_4-$ and $HSO_4$.

14. A method of making an electroconductive polymeric material comprising:

dispersing dicyclopentadienyl iron with no chemical reaction in a resin selected from the group consisting of vinyl chloride resin ($-CH_2-CHCl-$) structure in the molecular chain and a vinylidene chloride resin having ($-CH_2-CCl_2-$) structure in the molecular chain;

dissolving said resin in an organic solvent;

evaporating said solvent;

irradiating said resin with light having ultraviolet rays; and redissolving the polymeric material in said solvent so that said polymeric material becomes non-electroconductive.

15. The method as claimed in claim 14, wherein said resin comprises a material selected from the group consisting of a vinyl chloride homopolymer, a vinyl chloride/vinyl acetate copolymer, a vinyl chloride/ethylene copolymer, a vinyl chloride/ethylene/vinyl acetate graft copolymer, a vinylidene chloride homopolymer and a vinyl chloride/vinylidene chloride copolymer.

16. The method as claimed in claim 14, wherein said organic solvent comprises a material selected from the group consisting of methylethylketone, tetrahydrofuran, dimethyl formamide and chloroform.

17. The method as claimed in claim 14, and further comprising doping said irradiated resin with an anionic dopant.

18. The electroconductive polymeric material as claimed in claim 17, wherein said dopant is a material selected from the group consisting of $ClO_4-$, $AsF_4-$, $PF_4-$, $BF_4-$ and $HSO_4$.

* * * * *